United States Patent [19]

Suzuki et al.

[11] 4,126,891
[45] Nov. 21, 1978

[54] SWITCHING REGULATOR WITH FEEDBACK SYSTEM FOR REGULATING OUTPUT CURRENT

[75] Inventors: Tadao Suzuki; Shigeaki Wachi, both of Tokyo, Japan

[73] Assignee: Sony Corporation, Tokyo, Japan

[21] Appl. No.: 751,641

[22] Filed: Dec. 17, 1976

[30] Foreign Application Priority Data

Dec. 24, 1975 [JP] Japan .................................. 50-153345

[51] Int. Cl.² .......................................... H02M 7/217
[52] U.S. Cl. .................................................... 363/26
[58] Field of Search ................. 323/17, 22 T, DIG. 1; 363/15, 16, 19, 21, 23, 26, 37

[56] References Cited

U.S. PATENT DOCUMENTS

| | | | |
|---|---|---|---|
| 3,122,697 | 2/1964 | Kauders | 323/22 T |
| 3,551,777 | 12/1970 | Bingley | 363/26 |
| 3,657,631 | 4/1972 | Martens et al. | 363/26 |
| 3,839,668 | 10/1974 | Black | 363/23 |
| 3,967,181 | 6/1976 | Chambers et al. | 363/23 |
| 4,017,787 | 4/1977 | Hara et al. | 363/26 |

FOREIGN PATENT DOCUMENTS 826,783   1/1960   United Kingdom ...................... 363/23

*Primary Examiner*—Gerald Goldberg
*Attorney, Agent, or Firm*—Hill, Gross, Simpson, Van Santen, Steadman, Chiara & Simpson

[57] ABSTRACT

A switching regulator includes a chopper circuit and a DC-DC converter. A switching signal for use with the chopper circuit is derived from an inverter portion of the DC-DC converter so as not to use an external pulse oscillator. A DC voltage feedback circuit is provided from the output of the DC-DC converter to the chopper circuit so as to stabilize the DC output signal of the DC-DC converter.

7 Claims, 12 Drawing Figures

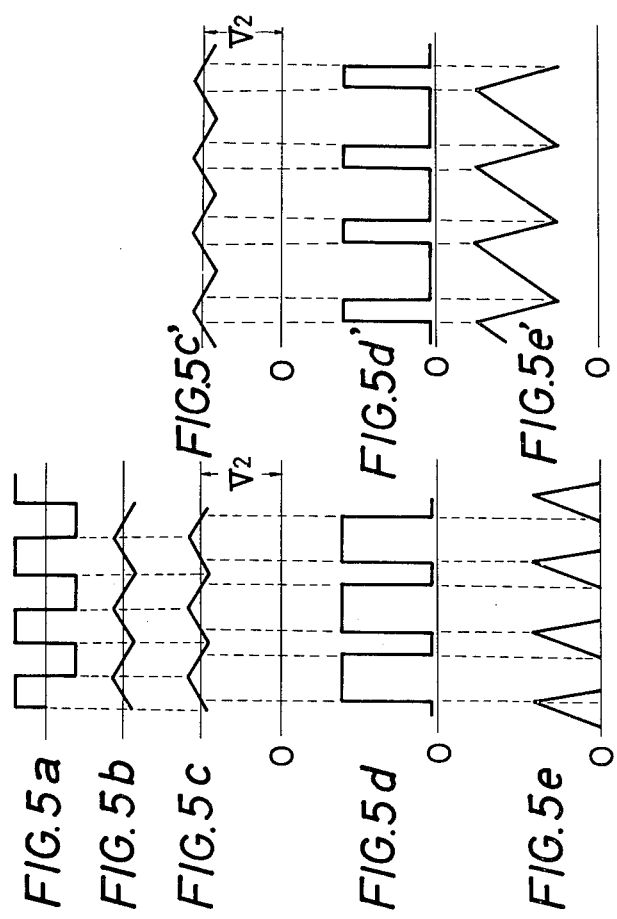

SWITCHING REGULATOR WITH FEEDBACK SYSTEM FOR REGULATING OUTPUT CURRENT

BACKGROUND OF THE INVENTION

1. Field of the Invention

This invention relates to a switching regulator, especially the type comprising a chopper circuit and a DC-DC converter.

2. Description of the Prior Art

A conventional switching regulator serves the purpose of controlling DC output voltage by means of switching elements such as transistors which enable the ON/OFF operation of the pulse. The benefits of this system are a smaller loss of power, better performance, and compactness in design.

The most typical types now available on the market are the chopper circuit type and the DC-DC converter. There is also a combination of these two features to ensure a better control of DC output voltage against an erratic AC power source.

However, they must be equipped with pulse operation in the chopper circuit to make the switching operation possible, and with an isolator for high voltage insulation such as a photocoupler in the feedback circuit from the DC-DC converter to the chopper circuit. All these additions make the system a complicated one and expensive as well.

SUMMARY OF THE INVENTION

An object of the present invention is to eliminate the above mentioned disadvantages. Another object of the present invention includes the combination of the chopper circuit.

Another object is to obtain the synchronizing signals of the chopper circuit from the inverter of the DC-DC converter. This could be realized only after achieving the combination of the chopper circuit and the DC-DC converter.

Another object of the present invention is to eliminate the isolator in the voltage feedback circuit installed between the chopper circuit and the DC-DC converter.

Another object of the present invention is the addition of a detecting winding which detects at the output of the inverter in the DC-DC converter.

According to one example of the present invention, a switching regulator is provided, which includes:

(a) a DC voltage source circuit;
(b) a chopper circuit for receiving the output signal from the DC voltage source circuit and producing a first pulse signal which is smoothed by a low pass filter so as to obtain a first DC voltage at the output terminal thereof;
(c) a DC-DC converter circuit which at least includes an inverter circuit for receiving the first DC voltage of the chopper circuit and producing a second pulse signal which is rectified by a rectifier circuit so as to obtain a second DC voltage to be adapted to supply it to a load; and
(d) a feedback circuit supplying a control signal from the inverter circuit to the chopper circuit so as to control the ON/OFF operation of the chopper circuit in response to said control signal.

The other objects, features and advantages of the present invention will be apparent from the following description taken in conjunction with the attached drawings.

BRIEF DESCRIPTION OF THE DRAWINGS

FIGS. 5a to 5e and FIGS. 5c' to 5e' show waveforms at various points in the above circuits to explain the performance of this invention.

DESCRIPTION OF THE PREFERRED EMBODIMENTS

Preceding the explanation of the present invention, the conventional switching system is explained.

Figure 1:
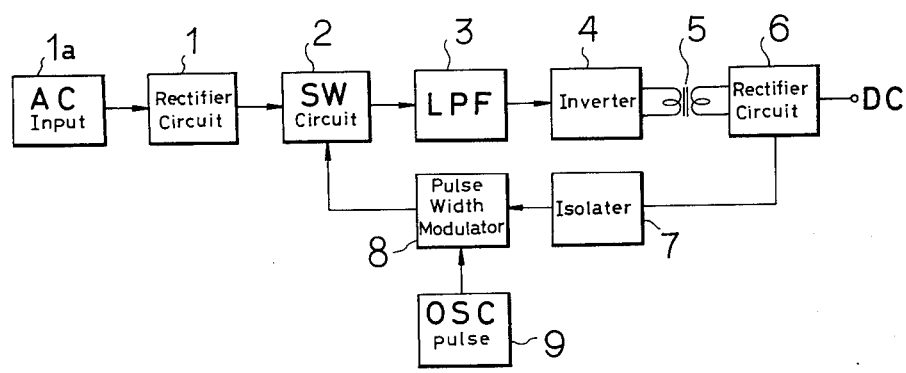
FIG. 1 is a block diagram of the conventional switching regulator.

A conventional switching regulator (such as FIG. 1) supplies a DC signal to the switching circuit 2 after having rectified the AC input 1a in the rectifier circuit 1. This DC signal is switched and converted into an AC signal, which, while passing through the low pass filter 3, changes into DC. This DC voltage is applied to the inverter 4. The output of the inverter is rectified at the rectifier circuit 6 which is connected to the transformer 5, and the regulated DC voltage (not shown in the figure) is supplied to the load. At the same time the DC output insulates the primary and the secondary of the output transformer by an isolator 7, and feedback to the pulse width modulator 8 for the stabilization of the output voltage.

The pulse width modulator 8 has connected thereto a pulse generator 9 to generate a triangular wave or sawtooth wave. A decrease or increase in the DC output voltage mentioned above affects the pulse and changes its width. This serves to supplement changes of the output voltage and make it possible to stabilize the DC output voltage.

So, the conventional switching regulator, like the one explained above, requires a pulse generator 9 which provides pulse width modulation. Also, a relatively expensive coupler is required to insulate the DC output of the rectifier circuit 6 from the pulse width modulator 8. Moreover, the DC output is supplied directly to the pulse width modulator 8, and this could cause variations in the operation of the feedback circuit.

The present invention eliminates all of these inconveniences or performance defects of the conventional switching regulator. The present invention eliminates the need for the isolator and the pulse generator but still provides good voltage regulation.

Now, the present invention is described in detail by way of some preferred embodiments thereof with reference to the accompanying drawings.

Figure 2:
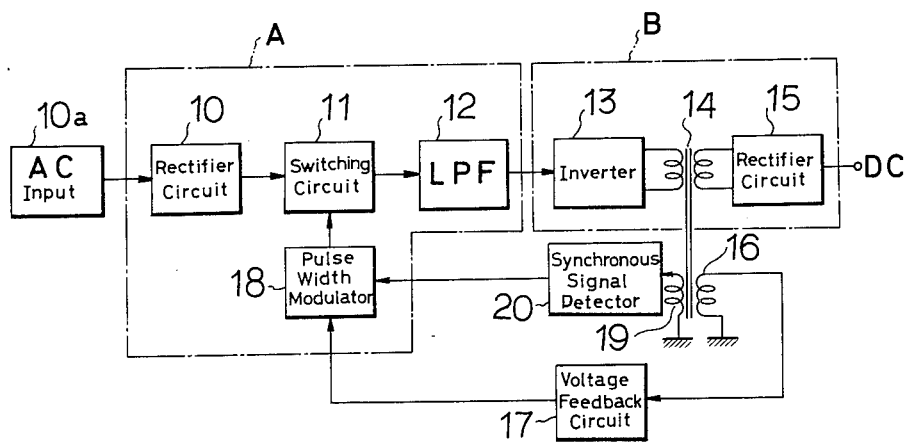
FIG. 2 is a block diagram showing an embodiment of this present invention.

FIG. 2 is the block diagram showing one embodiment of the present invention. In this figure A is the chopper circuit, B indicates the entire system of the DC-DC converter, 10 indicates the rectifier circuit to rectify the AC input 10a, 11 indicates the switching circuit to convert the output of the rectifier circuit to an AC signal, 12 indicates the low pass filter, 13 indicates the inverter, 14 indicates the output transformer, 15 indicates the rectifier circuit from which the regulated DC voltage output is obtained, and 16 is a winding for detecting feedback voltage which is different from the above mentioned secondary winding of the output transformer. Winding 16 serves to detect the output corresponding to variations of the output voltage and adds it to the pulse modulator 18 via the voltage feedback circuit 17.

On the other hand, the output transformer 14 connected to the output side of the above-mentioned inverter 13 has a detecting winding 19 to detect the signals to synchronize with the inverter output. The detected synchronizing signals are applied to the pulse width modulator 18 via the synchronizing signal detector 20 equipped with an integral circuit and other systems.

In accordance with the detected variations recorded as the pulse width of the DC output, the switching time of the switching circuit 11 is controlled. This is the manner by which the regulated voltage DC output is obtained.

The rectifier circuit 10, switching circuit 11, low pass filter 12, and pulse width modulator constitute the chopper circuit A. The inverter 13, output transformer 14 and the rectifier circuit 15 constitute the DC-DC converter B.

The possibility of using the chopper circuit A and DC-DC converter B in FIG. 2 as circuits shown in FIG. 3 and FIG. 4 will be explained hereinafter.

Figure 3:
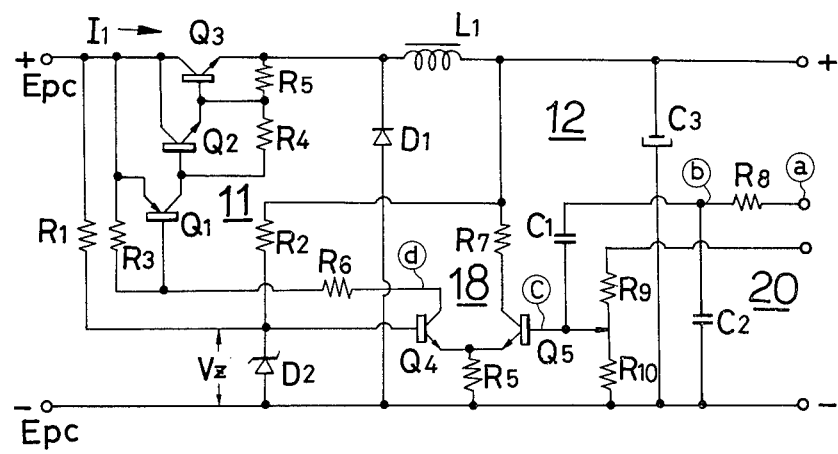
FIG. 3 is an electrical circuit showing an example of a chopper circuit used in the switching regulation according to the present invention.
Figure 4:
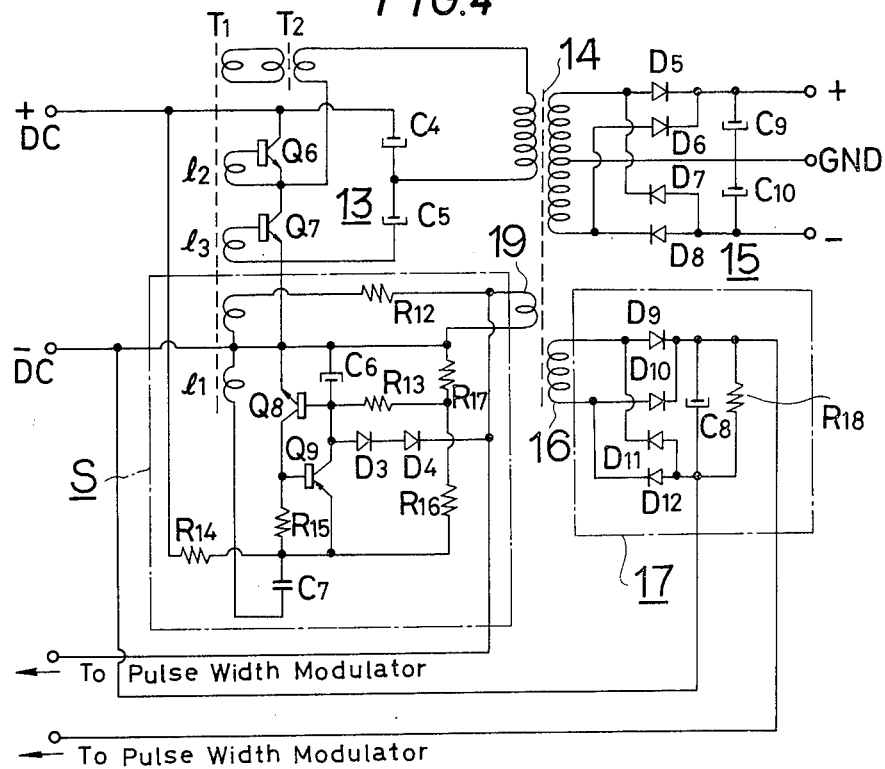
FIG. 4 is an electrical circuit of a DC-DC converter used in the switching regulation according to the present invention.

FIG. 3 shows the chopper circuit A of FIG. 2. This chopper circuit A receives a DC output through the circuit rectifier 10 which rectifies the AC input. The DC output is connected into a constant DC output voltage via the switching circuit 11 and the low pass filter 12. For this purpose, the feedback voltage will be used by the detecting winding 16 of the output transformer 14 on the output side of the inverter 13 in order to control the switching circuit 11. The output signal of the inverter 13 is detected by the detecting winding 19, and that will be the switching signal for the chopper circuit A.

The PWM signal to control the switching circuit 11 comprises the synchronizing signal and the feedback voltage; that is, the DC output (+Epc) obtained by rectifying the AC input is switched by Darlington-connected transistors Q1, Q2 and Q3, into an AC pulse signal, and, after smoothing by low pass filter 12 consisting of choke coil L1 and capacity C1, is supplied to the inverter 13.

The DC-DC converter B supplies a square wave pulse synchronizing signal (FIG. 5 (a)) to the base of one of the transistors Q4 and Q5 of the differential amplifier via an integrating circuit made of resistor R8 and capacity C2 (FIG. 5 (b)).

From the detecting winding 16 of the DC-DC converter B, a DC voltage corresponding to the regulated voltage DC output will be applied to the base of the transistor Q5 via the variable resistor R9.

Therefore, the base of transistor Q5 gets output (FIG. 5 (c)) that is a sum of the feedback voltage of the return voltage detecting winding 16 and the triangular signal, such as the integrated output of the synchronizing signal.

In this manner, by comparing in the differential amplifier the output with the reference voltage Vz on the base of transistor Q4, the pulse width modulation signal shown in FIG. 5 (d) can be obtained at the collector of the transistor Q4.

Current $I_1$ (FIG. 5 (e)) corresponding to the pulse width modulation signal runs through the collector of the switching transistor Q3 and is applied to the inverter 13 via the choke coil L1 which makes up low pass filter 12.

In this block diagram, D1 shows the diode which permits a rapid flow of energy in the choke coil L1; D2 shows the Zener diode which establishes the reference voltage for the operation of transistor Q4; R6 and R7 show damping resistors of transistor Q4 and Q5; and R1 shows the driving resistor of the chopper circuit A to place transistor Q4 ON when the power is being supplied. R2 shows the resistor which provides the Zener diode D2 with the driving current to make it operate properly.

In the above embodiment, when too much load is presented to the output side of the rectifier circuit 15, the voltage from the detecting winding 16 is reduced, so that the type of signal illustrated in FIG. 5 (c) to FIG. 5 (e) can be obtained to increase the output voltage of rectifier circuit 15. In this way, DC output voltage is constant no matter how erratic the load.

Next, the construction and performance of the DC-DC converter B is described with reference to FIG. 4.

The output from the chopper circuit A, such as the DC output of the low pass filter 12, is converted into AC by transistor Q6 and Q7, and generates the pulse voltage at the primary coil of the output transformer 14. Here, when the output from the chopper circuit A is supplied, the transistor Q9 of the starter S begins to operate. At the same time, capacitor C7 is charged, and transistor Q8 is ON. By discharging electricity charged to capacitor C7, driving coil L1 is energized, a control coil (one of the control coils L2 and L3 that are connected to transistors Q6, Q7) is energized, so that oscillation starts.

Once the oscillation is started, there will be no rapid changes of voltage in capacitor C7. The base of transistor Q8 will have an inverse bias through diode D3 and D4, and this oscillation starting circuit is cut off.

In this way, the inverter continues to oscillate and generates square waves of pre-determined frequency in the circuit including coil L2 and L3 and capacitor C4 and C5. Its output is rectified by the rectifying circuit with diodes D5 and D8 and capacitors C9 and C10 via the secondary coil of the output transformer 14, and finally made into the DC output of the regulator voltage.

The above-mentioned square wave output is supplied to the previously described feedback voltage detecting winding 16 and the synchronizing signal detecting winding 19. From the feedback voltage detecting winding 16, the DC voltage corresponding to the regulated DC output voltage is obtained in insulation from the DC output circuit through the rectifying circuit consisting of diodes D9 to D12 and capacitor C8. This DC voltage is supplied to the pulse width modulator 18 of the chopper circuit through the voltage return circuit.

From the synchronizing signal detecting winding 19 a synchronizing pulse corresponding to the frequency mentioned above is obtained and supplied to the pulse width modulator 18 through the synchronizing signal detection circuit.

T1 shows the driving transformer and T2 shows the transformer for feedback of current.

By choice of the capacitor C3 and resistor R13 in the above circuit, and establishing the appropriate time constant, the follow up speed can be made variable.

Thus, the voltage feedback loop is formed on the secondary side of the output transformer 14 (apart from the circuit which creates the regulated DC output voltage) through the detecting winding for the feedback voltage, and therefore the operation is stabilized against input variations on the secondary side.

The voltage for the inverter 13 can be chosen so that the transistors Q6 and Q7 are used at a predetermined voltage. This also means that the system can be applicable to any power source and voltage.

As described above, the present invention has the following features. The chopper circuit has a switching circuit which is supplied with DC voltage and can be controlled by the output of the pulse width modulator. A DC-DC converter is connected to the chopper circuit and is equipped with an inverter, an output transformer, and a rectifier circuit for the supply of load voltage. A synchronizing signal detecting circuit detects a synchronizing signal from the output of the output transformer to synchronize the pulse modulator. A voltage feedback circuit is provided to control the pulse width according to a control voltage obtained by rectifying an output of the output transformer, the rectified output then being fed to the pulse width modulator.

In accordance with the present invention, the need for an isolator such as a photo-coupler has been eliminated along with the square wave generator needed to accompany the system in the conventional switching regulator, also contributing to constancy of the regulated voltage against change in the AC input voltage.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A switching regulator comprising:
   (a) a DC voltage source means;
   (b) first switching means supplied with the output of said DC voltage source means and producing a first pulse signal;
   (c) a pulse width modulator for applying a pulse width modulation signal to said first switching means;
   (d) a low pass filter supplied with said first pulse signal and producing a first DC voltage;
   (e) second switching means supplied with said first DC voltage and producing a second pulse signal across an output transformer having primary and secondary windings;
   (f) a rectifier circuit supplied with said second pulse signal and producing a second DC voltage; and
   (g) feedback circuit means connected between further separate secondary winding means of said output transformer and said pulse width modulator for supplying a DC voltage feedback signal and a separate synchronizing control pulse signal to said pulse width modulator in response to said second pulse signal.

2. A switching regulator according to claim 1 in which the output transformer separate secondary winding means are a separate feedback voltage detecting winding producing the DC voltage feedback signal and a separate synchronizing winding producing the synchronizing control pulse signal, a separate voltage rectifier and filter being provided between the voltage detecting winding and the pulse width modulator.

3. A switching regulator according to claim 1 in which said second switching means are part of an inverter and said separate synchronizing control pulse signal also feeds the inverter.

4. A switching regulator according to claim 1, in which said pulse width modulator comprises:
   (a) an integrator supplied with said synchronizing control pulse signal so as to produce a triangular waveform signal;
   (b) a summing circuit for receiving said triangular waveform signal and said DC voltage feedback signal and for producing an output signal; and
   (c) a differential amplifier supplied with the output signal of said summing circuit and a reference DC voltage so as to produce said PWM signal.

5. A switching regulator according to claim 4, in which said output transformer includes a first detecting winding for producing said synchronizing control pulse signal and a second detecting winding for producing a pulse signal which is rectified to produce said DC voltage feedback signal.

6. A switching regulator according to claim 4, in which said first switching means includes a first transistor with the collector and emitter electrodes connected in series between one terminal of said DC voltage source and one terminal of a L-C type low pass filter, and said pulse width modulator differential amplifier comprises second and third transistors each having base, emitter and collector electrodes, the emitter electrodes thereof being connected to each other and to a reference point through an emitter impedance, the base electrode of said second transistor being supplied with said reference DC voltage, the collector of said second transistor being connected to the base electrode of said first transistor, the base electrode of said third transistor being supplied with the output signal of said summing circuit and the collector electrode of said third transistor being connected to the output side of said L-C type low pass filter.

7. A switching regulator according to claim 6, in which said first transistor is comprised in a darlington-connected circuit.

* * * * *